Nov. 20, 1928.  
I. K. RYSTEDT  
1,692,578
PARKING DEVICE FOR AUTOMOBILES AND THE LIKE
Filed March 24, 1924  2 Sheets-Sheet 2
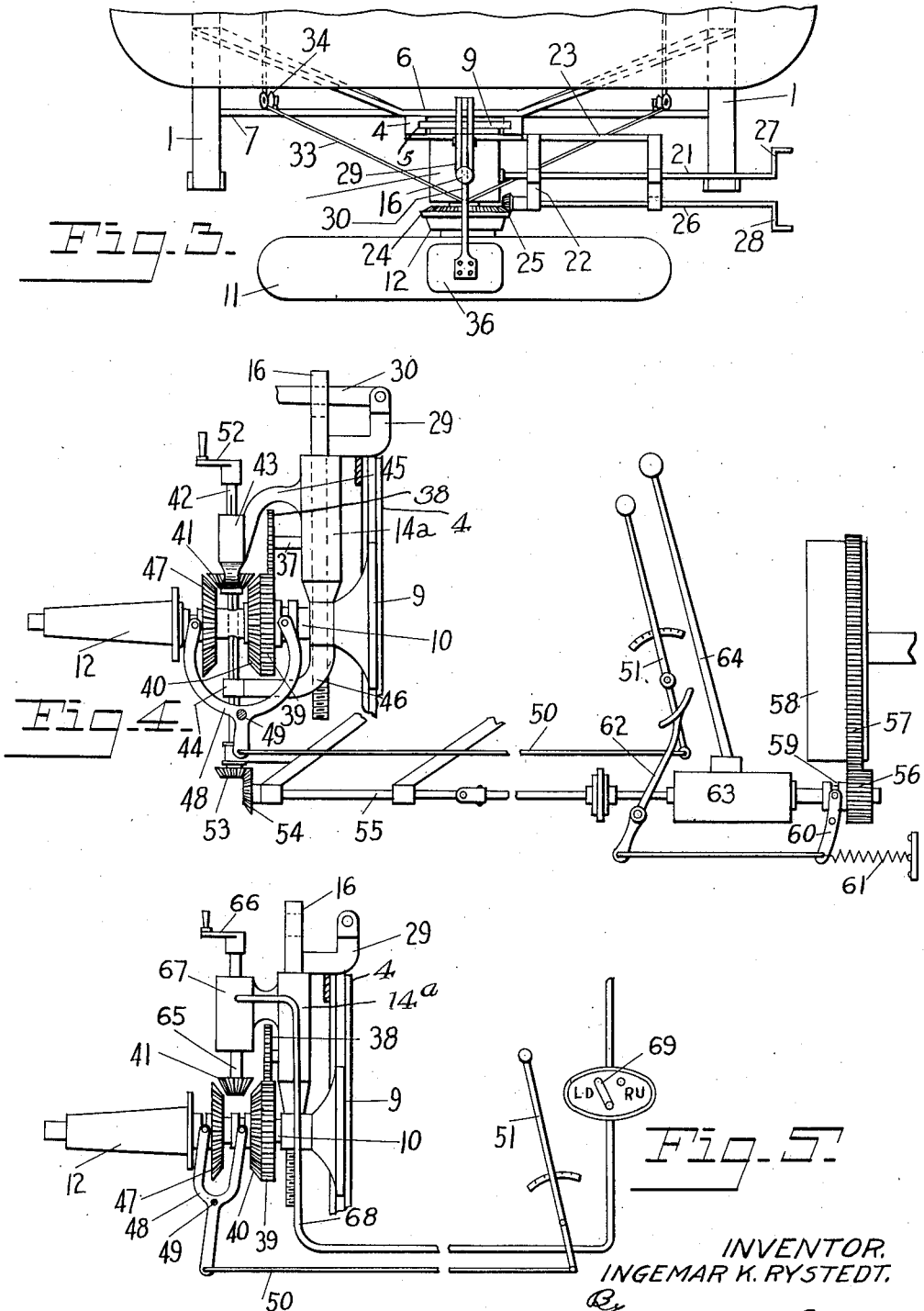
INVENTOR.  
INGEMAR K. RYSTEDT.  
By  
Edward Reed  
ATTORNEY.

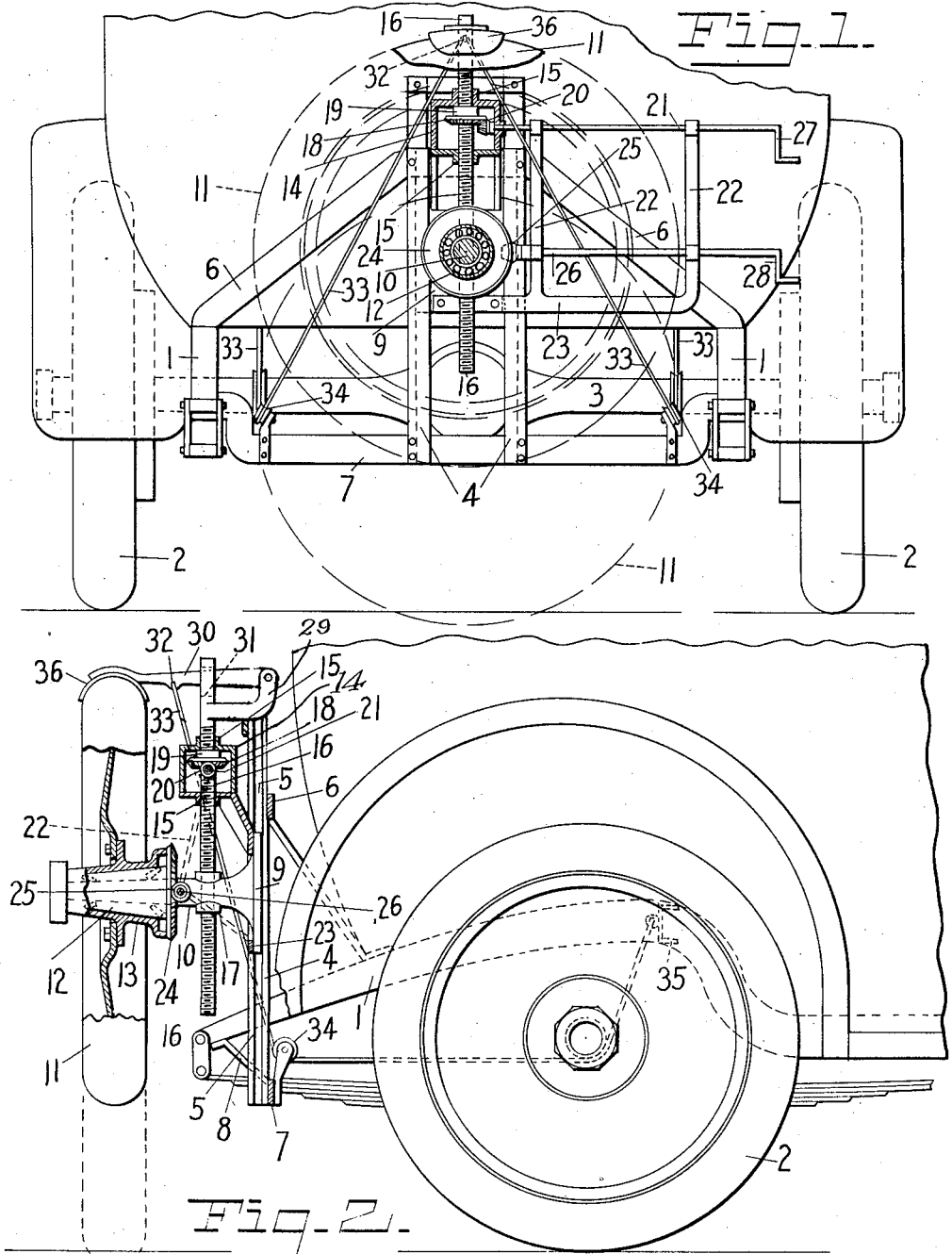

Patented Nov. 20, 1928.

1,692,578

UNITED STATES PATENT OFFICE.

INGEMAR KRISTOFFER RYSTEDT, OF DAYTON, OHIO.

PARKING DEVICE FOR AUTOMOBILES AND THE LIKE.

Application filed March 24, 1924. Serial No 701,348.

This invention relates to parking devices for automobiles and the like. It is frequently necessary or desirable to park an automobile parallel with the curb in a space between two other automobiles which is but slightly greater in length than the automobile which is to be parked and much difficulty is usually experienced in placing the automobile parallel with and close to the curb.

One object of the present invention is to provide an automobile with means whereby, when one end of the machine has been moved into a position adjacent to the curb, the other end thereof may be moved laterally toward the curb, thus positioning the machine parallel with the curb.

A further object of the invention is to provide means whereby a spare wheel carried by the automobile may be utilized for imparting this lateral movement to the machine.

A further object of the invention is to provide power operated means for moving the spare wheel into lifting engagement with the ground and for actuating the same to impart lateral movement to the machine.

A further object of the invention is to provide a device of this kind having means for causing the wheels at that end of the automobile which is lifted by the spare wheel to move upwardly with the body of the automobile, thereby enabling the wheels to be lifted off the ground with a minimum of vertical movement of the spare wheel.

A further object of the invention is to provide a device for so causing the automobile wheels to be lifted with the body of the automobile which will normally act as a snubber to limit the relative movements of the wheels and the body.

Other objects of the invention will appear as the device is described in detail.

In the accompanying drawings Fig. 1 is a rear elevation, partly in section, of an apparatus embodying my invention and showing the same mounted on the rear end of an automobile; Fig. 2 is a side elevation of the same, partly in section; Fig. 3 is a top plan view of the same; Fig. 4 is a detail view of the supporting and actuating device for the spare wheel, showing the same operatively connected with the automobile engine; and Fig. 5 is a detail view of the supporting and actuating device for the spare wheel, showing the same as operated by an electric motor.

In these drawings I have illustrated one embodiment of my invention, with two modifications of the actuating means therefor, and have shown the same as mounted at the rear end of an automobile of ordinary construction but it will be understood that the invention may be applied to motor driven vehicles of various kinds and that the mechanism itself may take various forms without departing from the spirit of the invention.

As shown in these drawings the automobile comprises a main frame 1 having driving wheels 2 which are carried by an axle enclosed in a housing 3, all of the usual construction. In applying my invention to this automobile I have mounted the rack or supporting device for the spare wheel in such a manner that it may be moved downwardly to cause the spare wheel to engage the ground and lift the automobile wheels out of engagement with the ground, thereby permitting lateral movement to be imparted to this end of the automobile on the spare wheel. Preferably means are also provided for positively operating the spare wheel to cause lateral movement to be imparted to the automobile. The term "spare wheel" as herein used means a wheel which is interchangeable with the automobile wheels and which is ordinarily carried on the automobile for emergency use. A spare wheel may consist of a complete wheel which is carried by the automobile and is removable as a whole for interchange with the automobile wheels or it may consist only of the demountable rim and the tire which may be rotatably supported on a suitable carrier, the rim and the tire being removable and being interchangeable with the rims and tires of the wheels of the automobile. The term "ground" is used in a broad sense and is intended to include any supporting surface, such as a roadway or pavement, or a garage floor or the like in the event the device is used for purposes other than parking the machine.

In that particular form of the device here shown the supporting structure comprises a frame which is rigidly secured to the frame 1 of the automobile and, in the present instance, consists of an upright member 4 having a vertical guideway 5. This member is supported at its upper end by a brace member consisting of outwardly and forwardly extending parts 6 which are rigidly secured at their forward and lower ends to the side members of the frame 1. At its lower end the vertical member 4 is rigidly secured to a transverse bar 7 which is connected at its ends with the side members of the automobile frame by portions 8 which constitute braces therefor, thereby rigidly connecting the frame member 4 with the automobile frame and providing the same with sufficient strength not only to carry the spare wheel and its associated parts but also to carry the weight of the rear end of the automobile. In the present construction, the vertical frame member 4 comprises two parallel channel members arranged with their channels facing one another to form the guideway 5. Mounted in this guideway is a slide block or cross head 9 having a rearwardly projecting part or spindle 10 adapted to receive and support a spare wheel, as shown at 11. Preferably the spindle 10 has rotatably mounted thereon a hub 12 adapted to enter the hub 13 of the wheel and thereby rotatably support the wheel on the supporting structure.

Any suitable means may be provided for imparting vertical movement to the wheel carrying member, consisting of parts 9 and 10, but I prefer to utilize screw operated means for this purpose. As here shown, the supporting structure further comprises a housing 14 which is rigidly secured to the cross head 9 and is provided in its upper and lower ends with openings 15 through which extends a vertical screw 16, the screw projecting beyond both the upper and lower ends of the housing. In the present instance, because of the length of the screw, the wheel supporting member or spindle 10 is provided with an opening, as shown at 17, through which the lower portion of the screw extends loosely. Mounted within the housing is a beveled gear 18 the hub portion 19 of which is threaded onto the screw 16. Meshing with this beveled gear and, in the present instance, arranged beneath the same, is a beveled pinion 20 mounted on a shaft 21 journaled in upright members or arms 22 forming part of a supplemental frame 23 rigidly secured to and having movement with the cross head 9. It will be noted that the beveled gear 18 is held between the pinion 20 and the upper wall of the housing 14 so that it has no axial movement relatively to the housing. Consequently when the beveled gear is rotated either the screw or the housing must move. When the screw is held against movement the rotation of the beveled gear thereon will cause the housing to move downwardly, thus carrying with it the cross head 9 and the spindle 10 which supports the spare wheel. It will be apparent, therefore, that the continued rotation of the screw will move the wheel downwardly into contact with the ground and thus cause the adjacent end of the automobile to be lifted and supported by the spare wheel, with the automobile wheels out of engagement with the ground. In this position said end portion of the automobile may be moved laterally on the spare wheel. Preferably means are provided for rotating the spare wheel and thus imparting lateral movement to the end of the automobile. In the present instance, I have rigidly secured to the hub 12 a beveled gear 24 with which meshes a beveled pinion 25 which is carried by a shaft 26 journaled in the arms 22 of the supplemental frame 23. The beveled pinions 20 and 25 which control the movement of the spare wheel may be actuated in any suitable manner and in that form of the device shown in Figs. 1 to 3 the shafts 21 and 26 extend to points near the side of the automobile and are there provided with handles or cranks 27 and 28 by means of which the pinions may be operated.

The drive wheels 2 and their axle being movable with relation to the frame of the automobile will tend to drop away from the frame as the latter is lifted by the spare wheel and if no means are provided for preventing this separation of the axle and the frame it will be necessary to impart a relatively long movement to the spare wheel before the drive wheels can be lifted out of engagement with the ground. I have therefore provided means for causing the axle and the driving wheels to move with the automobile frame when the latter is lifted. This means may be of any suitable character but, in the present instance, it consists of a flexible member connected with the frame and with the screw 16 of the spare wheel supporting device and in operative engagement with the axle, the arrangement being such that normally the flexible member will have sufficient slack to permit of the normal movement of the axle with relation to the frame but when the screw is operated to lower the spare wheel this slack will be taken up and the axle caused to move with the frame. As here shown, I have provided the screw 16 above the housing 14 with a bracket or arm 29 on which is pivotally mounted an arm 30 which extends through a slot 31 in the upper end of the screw and is provided with an opening 32. A flexible member, such as a steel cable 33, extends through this opening in the arm 30 and its end portions are carried downwardly about guides 34 arranged near the respective sides of the supporting structure and then forwardly beneath the housing 3 of the axle and upwardly, where they are connected with the automobile frame, preferably to a transverse member 35. It will be noted that the bracket 29 overhangs the upper end of the frame member 4 and will engage that frame member to limit the downward movement of the screw, the arrangement being such, however, that the screw may be moved upwardly away from the frame member. When the screw is in its normal position and the spare wheel in its elevated position the cable 33 will have sufficient slack to permit of the ordinary relative movement of the frame and axle. The rotation of the combined pinion and nut 18 will impart movement either to the screw or to the housing. If the downward movement of the housing and the spare wheel is resisted from any cause, as by the gumming up of the grease in the guideway 5, the rotation of the nut 18 will first cause the screw to travel upwardly until the lower edge of the slot 31 therein engages the arm 30 and moves that arm upwardly far enough to tighten the cable 33. The upward movement of the screw being thus checked the further rotation of the beveled gear 18 will cause the housing and wheel supporting member to move downwardly as above described and inasmuch as the axle is supported by the flexible member or cable 33 it will not be permitted to drop away from the frame when the latter is lifted by the spare wheel. This lifting device for the axle may also be utilized as a snubber to limit the relative movements of the axle and the automobile frame due to a rough roadway. To this end the arm 30 is provided with a shoe 36 which rests upon the tire of the spare wheel, preferably on the upper central portion thereof, when the wheel is in its elevated position. Consequently when the parts are in their normal positions, the separation of the frame and the axle will cause the axle to engage the cable and to tend to move the arm downwardly but this movement will be resisted by the tire on the spare wheel, thus limiting the amount of separation between the frame and the axle and preventing severe vibrations or jolts on the body of the machine.

In Fig. 4 of the drawings, I have shown means whereby the device may be actuated from the automobile engine both to impart vertical movement to the spare wheel and to rotate the same. As there shown, the wheel supporting mechanism is substantially the same as that above described with the exception that the housing which is shown at 14ª is elongated and extends downwardly into engagement with the spindle 10. The beveled pinion 20 which actuates the beveled gear 18 is carried by a short shaft 37 on which is mounted a spur gear 38 meshing with a spur gear 39 rotatably and slidably mounted on the spindle 10. This spur gear has rigidly secured thereto and, in the present instance, formed integral therewith, a beveled gear 40 which is adapted to mesh with a beveled gear 41 on a shaft 42 which extends transversely to the spindle 10 and is journaled in bearings 43 and 44 carried respectively by arms 45 and 46 rigidly connected with the housing 14ª. The gear which rotates the wheel supporting hub 12 is shown at 47 and is slidably mounted on the spindle 10 for movement into and out of mesh with the beveled pinion 41. It will be apparent, therefore, that the beveled pinion 41 may be connected with either the screw operating gear 39 or the wheel rotating gear 47. In order to shift the beveled gears from one position to another and to prevent both gears being moved into mesh with the pinion at the same time a yoke 48 is pivotally mounted at 49 and the arms of this yoke carry pins which enter grooves in the hubs of the respective gears, so that the movement of the yoke in one direction will cause one gear to mesh with the pinion and its movement in the other direction will cause the other gear to mesh with the pinion. In the present arrangement this yoke is operable from the driver's seat and to this end it is connected by a rod 50 with an operating lever 51 arranged adjacent to the driver's seat. The pinion 41 which actuates the gears 39 and 47 may be driven in any suitable manner and in the present device it is adapted either for manual operation or for operation from a suitable source of power. To this end the shaft 42 which carries the pinion 41 is provided at one end with a handle or crank 52 and at the other end with a beveled pinion 53 which may be connected with any suitable source of power. The particular device here shown is designed for operation from the automobile engine and to this end a second beveled pinion 54 meshes with the pinion 53 and is mounted on a shaft 55 which extends forwardly and has connected with its forward end a pinon 56 adapted to mesh with a gear 57 on the fly wheel 58 of the automobile engine. The pinion 56 is movable on the shaft into and out of mesh with the gear 57 and, as here shown, it is provided with a grooved hub 59 which is engaged by a yoke 60. This yoke is acted upon by a spring 61 which tends to hold the gear 56 normally in its inoperative position, that is, out of mesh with the gear 57, and is also acted upon by a foot lever 62 by means of which the pinion may be moved against the tension of the spring 61 and caused to mesh with the gear 57. Interposed between the ends of the shaft 55 is a suitable reversing mechanism 63 which is operated by a lever 64 arranged adjacent to the driver's seat. This reversing mechanism may be of any suitable character and is not here shown in detail. It is only necessary that it should function to reverse the direction of rotation of the shaft 55 so that the spare wheel may be either raised or lowered or may be rotated in either direction by the operation of the gear 57 in one direction. It will be understood that normally the yoke 48 which actuates the beveled gears 39 and 47 will be so positioned that both of these gears will be out of mesh with the driving pinion 41 and the spring 61 will hold the pinion 56 out of mesh with the gear 57 so that the whole mechanism is inoperative. When it is desired to lower the spare wheel the beveled gear 39 is moved into mesh with the pinion 41, the reversing mechanism 63 set to drive the shaft 55 forwardly and the pinion 56 moved into mesh with the gear 57. This results in the spare wheel being moved into operative position. As soon as the driving wheels of the automobile are lifted off the ground the beveled gear 39 is moved out of mesh with the pinion 41 and the beveled gear 47 is moved into mesh with that pinion, thus causing the wheel to be rotated from the engine and lateral movement imparted to the rear end of the automobile. When the machine has been parked the reversing mechanism 63 is operated to reverse the direction of rotation of the shaft and the spare wheel is restored to its normal position and the operations which have just been described are repeated to remove the automobile from the parking space.

If desired, a separate power unit may be provided for operating the parking mechanism and in Fig. 5 I have shown a device provided with an electric motor for this purpose. The construction is substantially the same as that shown in Fig. 4 with the exception that the pinion 41 which actuates the screw operating and wheel rotating gears is mounted on a shaft 65 which, in addition to having the operating handle 66, has direct connection with an electric motor 67. The conductors 68 for the motor are led forwardly to a point adjacent to the driver's seat and there provided with a suitable controlling switch 69.

While I have shown and described certain embodiments of my invention I wish it to be understood that I do not desire to be limited to the details thereof as various modifications may appear to a person skilled in the art.

Having now fully described my invention, what I claim as new and desire to secure by Letters Patent, is:

1. The combination with an automobile comprising a frame, an axle having movement toward and from said frame, and wheels carried by said axle, of a supporting structure mounted on said frame and having means for rotatably supporting a spare wheel on an axis transverse to said axle, means for actuating said wheel supporting means to move said spare wheel into engagement with the ground and to cause the same to lift said frame, and means connected with said supporting structure for causing said axle to move with said frame when the latter is elevated by said spare wheel.

2. The combination with an automobile comprising a frame, an axle having movement toward and from said frame, and wheels carried by said axle, of a supporting structure mounted on said frame and having means for rotatably supporting a spare wheel on an axis transverse to said axle, means for actuating said wheel supporting means to move said spare wheel into engagement with the ground and to cause the same to lift said frame, and a device connected with said frame and said supporting structure and engaging said axle to cause the same to move with said frame when the latter is lifted by said spare wheel.

3. The combination with an automobile comprising a frame, an axle having movement toward and from said frame, and wheels carried by said axle, of a supporting structure mounted on said frame and having means for rotatably supporting a spare wheel on an axis transverse to said axle, means for actuating said wheel supporting means to move said spare wheel into engagement with the ground and to cause the same to lift said frame, and a flexible device connected with said frame and said supporting structure and extending beneath said axle to cause the same to move with said frame when the latter is lifted by said spare wheel.

4. The combination with an automobile comprising a frame, an axle having movement toward and from said frame, and wheels carried by said axle, of a supporting structure mounted on said frame at one end thereof and having means for rotatably supporting a spare wheel on an axis transverse to said axle, an axle lifting device connected with said supporting structure and adapted to engage said axle, and actuating means to move said axle lifting device into operative engagement with said axle and to move said wheel supporting means to cause said spare wheel to engage the ground and lift said frame.

5. The combination with an automobile comprising a frame, an axle having movement toward and from said frame, and wheels carried by said axle, of a supporting structure mounted on one end of said frame and having means for rotatably supporting a spare wheel on an axis transverse to said axle, a flexible member connected between its ends with said supporting structure, extending downwardly and forwardly beneath said axle and having its forward ends connected with said frame near the respective sides thereof, and means to actuate said wheel supporting means to cause said spare wheel to engage the ground and lift said frame and said axle.

6. The combination with an automobile comprising a frame, an axle having movement toward and from said frame, and wheels carried by said axle, of a supporting structure mounted at one end of said frame and having means to rotatably support a spare wheel on an axis transverse to said axle, means for actuating said wheel supporting means to move said spare wheel into engagement with the ground and cause the same to lift said frame, a part movably mounted on said supporting structure, and a flexible member connected with said part and with said frame and extending beneath said axle, said part being so connected with said actuating means that the first movement of said actuating means will impart movement thereto to tighten said flexible member against said axle.

7. The combination with an automobile comprising a frame, an axle having movement toward and from said frame, and wheels carried by said axle, of a supporting structure mounted at one end of said frame and having means to rotatably support a spare wheel on an axis transverse to said axle, a housing connected with said wheel supporting means, a non-rotatable screw extending through said housing and having a slot in the upper portion thereof, an arm rigidly secured thereto adjacent to said slot, a beveled gear threaded onto said screw within said housing, a pinion meshing with said beveled gear, a shaft journaled in the wall of said housing and secured to said pinion, a lever pivotally mounted on the arm carried by said screw, extending through the slot in said screw and having a part to engage the tire of said spare wheel, and a flexible member connected with said arm, extending downwardly and forwardly beneath said axle and connected at its forward ends with said frame near the respective sides thereof.

8. The combination with an automobile, of a wheel supporting member mounted at one end of said automobile for vertical movement relative thereto and comprising a spindle, a hub rotatably mounted on said spindle and adapted to support a wheel on an axis extending lengthwise of said automobile, a shaft extending transversely to said spindle, a pinion rigidly secured to said shaft, beveled gears rotatably and slidably mounted on said spindle on opposite sides of said shaft, one of said gears being connected with said hub, means actuated by the other of said gears for imparting vertical movement to said wheel supporting member, means for shifting said gears into and out of mesh with said pinion, a gear driven by the engine of said automobile, and means for operatively connecting said shaft with said gear.

9. The combination with an automobile, of a wheel supporting member mounted at one end of said automobile for vertical movement relative thereto and comprising a spindle, a hub rotatably mounted on said spindle and adapted to support a wheel on an axis extending lengthwise of said automobile, a shaft extending transversely to said spindle, a pinion rigidly secured to said shaft, beveled gears rotatably and slidably mounted on said spindle on opposite sides of said shaft, one of said gears being connected with said hub, means actuated by the other of said gears for imparting vertical movement to said wheel supporting member, means for shifting said gears into and out of mesh with said pinion, a gear driven by the engine of said automobile, and means for reversibly connecting said shaft with said gear.

10. The combination with an automobile, of a wheel supporting member mounted at one end of said automobile for vertical movement relative thereto and comprising a spindle, a hub rotatably mounted on said spindle and adapted to support a wheel on an axis extending lengthwise of said automobile, a shaft extending transversely to said spindle, a pinion rigidly secured to said shaft, beveled gears rotatably and slidably mounted on said spindle on opposite sides of said shaft, one of said gears being connected with said hub, means actuated by the other of said gears for imparting vertical movement to said wheel supporting member, means for alternately moving said gears into and out of mesh with said pinion, a shaft having geared connection with the first mentioned shaft, a pinion slidably mounted on the last mentioned shaft and rotatable therewith, and means for actuating the last mentioned pinion to move the same into and out of mesh with the engine driven gear.

11. In a mechanism of the character described, a supporting structure adapted to be mounted on the frame of an automobile and comprising a vertically movable wheel supporting member arranged above the axle of said automobile, means for rotatably and removably supporting a spare tire on said wheel supporting member, a housing secured to said wheel supporting member, a non-rotatable screw extending through said housing for movement therein, a gear arranged within said housing and threaded onto said screw, a pinion to rotate said gear, and means to limit the upward movement of said screw.

12. In a mechanism of the character described, a structure having means for rigidly mounting the same on the frame of an automobile near one end thereof and comprising a vertical guideway, a supporting member having a part slidably mounted in said vertical guideway and having means for rotatably supporting a spare tire on an axis arranged normally above the axle of said automobile, means for moving said supporting member in said guideway to cause said tire to engage the ground and lift said frame, and means for causing said axle to move with said frame when the latter is lifted by the contact of said tire with the ground.

13. In a mechanism of the character described, a structure having means for rigidly mounting the same on the frame of an automobile near one end thereof and comprising a vertical guideway, a supporting member having a part slidably mounted in said guideway and having means for rotatably supporting a spare tire on an axis arranged normally above the axle of said automobile, means for moving said supporting member in said guideway to cause said tire to engage the ground and lift said frame, means for causing said axle to move with said frame when the latter is lifted by the contact of said tire with the ground, and means for rotating said tire on said supporting member.

14. In a parking mechanism adapted to be mounted on an automobile comprising a frame, an axle having movement toward and from said frame, and wheels carried by said axle, a structure having means for supporting the same on said frame and having means for rotatably supporting a spare tire on an axis transverse to said axle, means for actuating said tire supporting means to move said spare tire into engagement with the ground and to cause the same to lift said frame, and a device acting on said axle to cause the latter to move with said frame when said frame is lifted by said spare tire.

15. In a parking mechanism adapted to be mounted on an automobile comprising a frame, an axle having movement toward and from said frame, and wheels carried by said axle, a structure having means for supporting the same on said frame and having means for rotatably supporting a spare tire on an axis transverse to said axle, means for actuating said tire supporting means to move said spare tire into engagement with the ground and to cause the same to lift said frame, and a flexible device connected with said frame, extending beneath said axle and arranged to engage said axle and cause the same to move with said frame when the latter is lifted by the contact of said spare tire with the ground.

16. In a parking mechanism adapted to be mounted on an automobile comprising a frame, an axle having movement toward and from said frame, and wheels carried by said axle, a structure having means for supporting the same on said frame and having means for rotatably supporting a spare tire on an axis transverse to said axle, means for actuating said tire supporting means to move said spare tire into engagement with the ground and to cause the same to lift said frame, a flexible device connected with said frame, extending beneath said axle and arranged normally to permit the free movement of said axle with relation to said frame, and means to cause said flexible device to engage said axle and lift the same when said frame is lifted by said spare tire.

In testimony whereof, I affix my signature hereto.

INGEMAR KRISTOFFER RYSTEDT.